(12) United States Patent
Moriya et al.

(10) Patent No.: US 7,122,584 B2
(45) Date of Patent: Oct. 17, 2006

(54) FLEXIBLE RESIN PELLET AND PROCESS FOR PRODUCING THE SAME

(75) Inventors: Satoru Moriya, Ichihara (JP); Yasuhiro Hosomi, Yamaguchi (JP)

(73) Assignee: Mitsui Chemicals, Inc., Tokyo (JP)

( * ) Notice: Subject to any disclaimer, the term of this patent is extended or adjusted under 35 U.S.C. 154(b) by 227 days.

(21) Appl. No.: 10/311,634

(22) PCT Filed: Apr. 19, 2001

(86) PCT No.: PCT/JP01/03352

§ 371 (c)(1),
(2), (4) Date: Dec. 18, 2002

(87) PCT Pub. No.: WO02/085979

PCT Pub. Date: Oct. 31, 2002

(65) Prior Publication Data
US 2003/0181553 A1    Sep. 25, 2003

(51) Int. Cl.
*C08K 9/04* (2006.01)
*B05D 7/00* (2006.01)

(52) U.S. Cl. ............. 523/205; 523/212; 427/222; 524/430; 524/320; 524/398

(58) Field of Classification Search ........... 523/212, 523/205; 427/222
See application file for complete search history.

(56) References Cited

U.S. PATENT DOCUMENTS

| | | | | |
|---|---|---|---|---|
| 3,528,841 A | * | 9/1970 | Donaldson et al. | 427/222 |
| 3,821,154 A | * | 6/1974 | Dumoulin et al. | 524/266 |
| 3,927,166 A | | 12/1975 | Tomoda et al. | |
| 5,623,012 A | | 4/1997 | Hwo | |
| 6,111,021 A | * | 8/2000 | Nakahama et al. | 525/232 |
| 6,528,121 B1 | * | 3/2003 | Ona et al. | 427/387 |

FOREIGN PATENT DOCUMENTS

| | | |
|---|---|---|
| DE | 3913 773 | 1/1990 |
| EP | 234565 A2 | 9/1987 |
| EP | 0 838 321 A2 | 4/1998 |
| JP | 4-047934 A | 7/1973 |
| JP | 56-136347 A | 10/1981 |
| JP | 4-001011 B2 | 1/1992 |
| JP | 4-279644 A | 10/1992 |
| JP | 8-41211 A | 2/1996 |
| JP | 2000-52335 A | 2/2000 |
| JP | 59-124829 A | 7/2005 |

* cited by examiner

*Primary Examiner*—Tae H. Yoon
(74) *Attorney, Agent, or Firm*—Birch, Stewart, Kolasch & Birch, LLP

(57) ABSTRACT

A soft resin pellet is provided comprising at least one liquid (B) having a kinematic viscosity at 25° C. ranging from 0.5 to 100,000 cSt (centistokes) and a surface tension at 25° C. ranging from 10 to 50 dyn/cm, and at least one fine powder (C) of an average particle diameter of not more than 50 μm, which fine powder adheres to the surface of pellets of at least one soft resin having a tensile modulus determined according to ASTM D-658 not higher than 1600 Mpa.

22 Claims, No Drawings

FLEXIBLE RESIN PELLET AND PROCESS FOR PRODUCING THE SAME

This application is the national phase under 35 U.S.C. §371 of PCT International Application No. PCT/JP01/03352 which has an International filing date of Apr. 19, 2001, which designated the United States of America.

TECHNICAL FIELD

The present invention relates to a soft resin pellet having excellent stick-resistance and having excellent external appearance, and a process for producing the same.

BACKGROUND ART

Soft resins such as olefin copolymer rubber like ethylene/propylene copolymer rubber, and ethylene/propylene/diene copolymer rubber are marketed usually in a shape of blocks such as bales.

Such a block-shaped olefin copolymer rubber have disadvantages of troublesomeness in taking-out from a storage site, and in supply or transportation to a molding and processing apparatus, and in weighing.

Accordingly, the olefin copolymer rubber, if supplied in a pellet form, can be free from the above disadvantages, and has various advantages: an extruder of high productivity can be used for preparing a compounded rubber from the pelletized olefin copolymer rubber and a compounding ingredient in place of the less efficient mixer like a Banbury mixer conventionally used for blending an olefin copolymer rubber and a conventional formulating ingredient such as fillers, softeners, and vulcanizing agents.

However, the above olefin copolymer rubber, even if it is pelletized, will cohere together into blocks during storage owing to the stickiness of the olefin copolymer resin itself to lose the advantages of the pelletization.

Even an ethylene/α-olefin copolymer elastomer which is less sticking at an ordinary temperature can cause cohesion of the pellets when the pellets are stored with a load applied thereon or stored in a high temperature environment in summer, thereby decreasing the value as a pelletized product.

Various methods have been disclosed for decreasing the surface stickiness of the pellets of the inherently sticky olefin copolymer rubber, or preventing cohesion of the pellets of an olefin elastomer, which is less sticky in ordinary temperature, under a load and/or at a high temperature. For example, the surface of the rubber pellets is coated with a silicone oil (Japanese Patent Application Laid-Open No. 48(1973)-47934). In another method, a powdery matter such as powdery inorganic substances like talc, silica, and calcium carbonate, or a powdery polyethylene is dusted onto the pellets as an anti-blocking agent to allow the powdery matter to adhere to the sticky pellet surface.

However, the coating of the surface of the rubber pellets or elastomer pellets with a silicone oil has a disadvantage that the intended sufficient effects cannot be achieved for the pellets having a strong stickiness. With the latter method, the powdery matter dusted can give adverse effects in the properties of the rubber in end use, since the inorganic material like talc and silica is not compatible with the olefin copolymer rubber. Furthermore, in this method of dusting of a powdery matter, the stickiness-preventing powdery matter is used in an amount from several to ten-and-several percents based on the weight of the pellets to prevent substantially the cohesion of the pellets. Such a large amount of the powdery matter will impair the properties of the treated olefin copolymer rubber. For example, the rubber properties of a vulcanized olefin copolymer rubber dusted with powdery polyethylene become deteriorated with increase of the amount of the adhering powdery polyethylene. Further, with this method, dustiness of the pellet surface impairs the external appearance of the pellets and makes the handling troublesome.

An effective countermeasure against the pellet cohesion is disclosed by the inventors of the present invention (Japanese Patent Application Laid-Open No. 56(1981)-136347) in which rubber pellets are coated with a higher fatty acid and/or a salt thereof. This method can prevent the sticking of rubber pellets without impairing the rubber properties substantially.

However, the inventors of the present invention found that the method disclosed in the above Patent Laid-Open Publication cannot allow the higher fatty acid and/or its salt to adhere stably in a sufficient amount onto rubber pellets since the higher fatty acid and/or its salt is simply mixed with the rubber, and may still cause blocking (cohesion) during storage, or after transportation, weighing, and other treatment.

The inventors of the present invention, after comprehensive investigation, disclosed a method of preventing the blocking of the rubber pellets during storage, in which the olefin copolymer rubber pellets, fine powdery higher fatty acid of 12–30 carbon atoms and/or its salt, are mixed in the presence of a monohydric alcohol of 1–4 carbon atoms to prepare less sticky rubber pellets (Japanese Patent Publication No. 4(1992)-1011). The rubber pellets coated with the higher fatty acid and/or its salt produced according to this method do not cause blocking, even after the pelletized rubber is transported, packed into bags in an amount of 25 kg per bag, and bags are stacked up in 10 stairs for one month. In this method, however, the powder-dusted state of the pellet surface may cause some trouble in handling.

At the moment, to meet the users' request, appearance of a pelletized soft resin which is nonsticky and has excellent appearance, and is easily handleable in comparison with conventional pelletized soft resins like olefin copolymer rubbers, and a method of producing the same is desired.

The present invention intends to solve the above problems of the prior art techniques, and to provide a soft resin pellet which is nonsticky and has excellent appearance, and is easily handleable in comparison with conventional pelletized soft resins like olefin copolymer rubbers, and a process for production thereof.

DISCLOSURE OF THE INVENTION

The soft resin pellet of the present invention comprises;
at least one liquid (B) having a kinematic viscosity at 25° C. ranging from 0.5 to 100,000 cSt (centistokes) and a surface tension at 25° C. ranging from 10 to 50 dyn/cm, and
at least one kind of fine powder (C) of an average particle diameter of not more than 50 μm,
which adhere to the surface of pellets of at least one soft resin (A) selected from the group consisting of the resins (i)–(v) below and having a tensile modulus (YM: ASTM D-658) not higher than 1600 MPa:
(i) ethylene/α-olefin copolymers produced by copolymerizing ethylene and at least one α-olefin of 3–20 carbon atoms,
(ii) propylene/α-olefin copolymers produced by copolymerizing propylene and at least one α-olefin of 2 or 4–20 carbon atoms, (iii) unsaturated olefin copolymers produced by copolymerizing randomly ethylene, at least one α-olefin of 3–20 carbon atoms, and at least one monomer selected from the group consisting of conjugated diene monomers represented by the chemical formula below and nonconjugated polyene monomers:

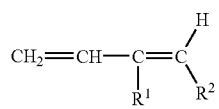

(in the chemical formula, $R^1$ and $R^2$ denoting independently a hydrogen atom, an alkyl group of 1–8 carbon atoms, or an aryl group respectively, and at least one of $R^1$ and $R^2$ is a hydrogen atom),
(iv) ethylene/vinyl acetate copolymers containing vinyl acetate at a content ranging from 5 to 40% by weight, and
(v) cycloolefin resins.

In the palletized soft resin of the present invention, 50 to 20,000 ppm by weight of the above liquid (B) based on the weight of the pellets of the soft resin (A) and 50 to 10,000 ppm by weight of the above fine powder (C) based on the weight of the pellets of the soft resin (A) may adhere to the surface of the pellets of the above soft resin (A).

The process for producing a soft resin pellet of the present invention comprises;
at least one liquid (B) having a kinematic viscosity at 25° C. ranging from 0.5 to 100,000 cSt (centistokes) and a surface tension at 25° C. ranging from 10 to 50 dyn/cm, and
at least one kind of fine powder (C) of an average particle diameter of not more than 50 μm,
adhering onto the surface of pellets of at least one soft resin (A) selected from the group consisting of the resins (i)–(v) below and having a tensile modulus (YM: ASTM D-658) not higher than 1600 MPa:
(i) ethylene/α-olefin copolymers produced by copolymerizing ethylene and at least one α-olefin of 3–20 carbon atoms,
(ii) propylene/α-olefin copolymers produced by copolymerizing propylene and at least one α-olefin of 2 or 4–20 carbon atoms,
(iii) unsaturated olefin copolymers produced by copolymerizing randomly ethylene, at least one α-olefin of 3–20 carbon atoms, and at least one monomer selected from the group consisting of conjugated diene monomers represented by the chemical formula below and nonconjugated polyene monomers:

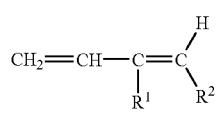

(in the chemical formula, $R^1$ and $R^2$ denoting independently a hydrogen atom, an alkyl group of 1–8 carbon atoms, or an aryl group respectively, and at least one of $R^1$ and $R^2$ is a hydrogen atom),
(iv) ethylene/vinyl acetate copolymers containing vinyl acetate at a content ranging from 5% to 40% by weight, and
(v) cycloolefin resins.

The soft resin (A) may contain an unsaturated carboxylic acid or its derivative at a content ranging from 0.01% to 30% by weight based on 100% by weight of the soft resin (A).

The ethylene/α-olefin copolymer (i) may be a modified ethylene/α-olefin copolymer (i-b) prepared by grafting an unsaturated carboxylic acid or its derivative in a ratio of 0.01% to 30% by weight onto an unmodified ethylene/α-olefin copolymer (i-a).

The propylene/α-olefin copolymer (ii) may be a modified propylene/α-olefin copolymer (ii-b) prepared by grafting an unsaturated carboxylic acid or its derivative in a ratio of 0.01% to 30% by weight onto an unmodified propylene/α-olefin copolymer (ii-a).

The unsaturated olefin copolymer (iii) may be a modified unsaturated olefin copolymer (iii-b) prepared by grafting an unsaturated carboxylic acid or its derivative in a ratio of 0.01% to 30% by weight onto an unmodified unsaturated olefin copolymer (iii-a).

The ethylene/vinyl acetate copolymer (iv) may be a modified ethylene/vinyl acetate copolymer (iv-b) prepared by grafting an unsaturated carboxylic acid or its derivative in a ratio of 0.01% to 30% by weight onto an unmodified ethylene/vinyl acetate copolymer (iv-a).

The cycloolefin resin (v) may be a modified cycloolefin resin prepared by grafting an unsaturated carboxylic acid or its derivative in a ratio of 0.01% to 30% by weight onto an unmodified cycloolefin resin.

The liquid (B) is particularly preferably a dimethylpolysiloxane.

The fine powder (C) is preferably a fatty acid or a fatty acid derivative. The particularly preferred ones include stearic acid, erucic acid, oleic acid, itaconic acid, and montanic acid; and metal salts, amides, and esters thereof.

BEST MODE FOR CARRYING OUT THE INVENTION

The soft resin pellet and the process for producing the same of the present invention are described below specifically.

The soft resin pellet of the present invention comprises at least one liquid (B) having a kinematic viscosity at 25° C. in a specified range and a surface tension at 25° C. in a specified range, and at least one kind of fine powder (C) having a specified average particle diameter, adhering to the surface of pellets of a specified soft resin (A).

In the process for producing a soft resin pellet of the present invention, the surface of pellets of a specified soft resin (A) is adhered by at least one liquid (B) having a kinematic viscosity at 25° C. in a specified range and a surface tension at 25° C. in a specified range and at least one kind of fine powder (C) having a specified average particle diameter.

The soft resin (A), the liquid (B), and the fine powder (C) which constitute the palletized soft resin of the present invention and are employed in the process for producing the same are explained.

Soft Resin (A)

The soft resin (A) employed in the present invention has a tensile modulus (YM: ASTM D-658) of not higher than 1600 MPa, usually in the range from 1 to 1600 MPa, preferably from 1 to 150 MPa. Such a soft resin (A) includes specifically ethylene/α-olefin copolymers (i), propylene/α-olefin copolymers (ii), unsaturated olefin copolymers (iii), ethylene/vinyl acetate copolymers (iv), and cycloolefin resins (v). These soft resins (A) may be used singly or in combination of two or more thereof. The combinations of two or more resins include those shown below.

(1) combinations of an ethylene/α-olefin copolymer (i) and a propylene/α-olefin copolymer (ii),
(2) combinations of an ethylene/α-olefin copolymer (i) and an unsaturated olefin copolymer (iii),
(3) combinations of an ethylene/α-olefin copolymer (i) and an ethylene/vinyl acetate copolymer (iv),
(4) combinations of an ethylene/α-olefin copolymer (i) and a cycloolefin resin (v),
(5) combinations of an ethylene/α-olefin copolymer (i), a propylene/α-olefin copolymer (ii), and an unsaturated olefin copolymer (iii),
(6) combinations of an ethylene/α-olefin copolymer (i), a propylene/α-olefin copolymer (ii), and an ethylene/vinyl acetate copolymer (iv),
(7) combinations of an ethylene/α-olefin copolymer (i), a propylene/α-olefin copolymer (ii), and a cycloolefin resin (v),
(8) combinations of an ethylene/α-olefin copolymer (i), an unsaturated olefin copolymer (iii), and an ethylene/vinyl acetate copolymer (iv),
(9) combinations of an ethylene/α-olefin copolymer (i), an unsaturated olefin copolymer (iii), and a cycloolefin resin (v),
(10) combinations of an ethylene/α-olefin copolymer (i), an ethylene/vinyl acetate copolymer (iv), and a cycloolefin resin (v), and
(11) combinations of an ethylene/α-olefin copolymer (i), a propylene/α-olefin copolymer (ii), an unsaturated olefin copolymer (iii), an ethylene/vinyl acetate copolymer (iv), and a cycloolefin resin (v).

The resin (i)–(v) which can be used as the soft resin employed in the present invention are explained hereunder.

Ethylene/α-Olefin Copolymer (i)

The ethylene/α-olefin copolymer (i) in the present invention is an ethylene/α-olefin copolymer (i-a) which is derived by copolymerization of ethylene and an α-olefin of 3–20 carbon atoms, or a modified ethylene/α-olefin copolymer (i-b) which is derived by grafting an unsaturated carboxylic acid or its derivative onto the copolymer (i-a), and has a tensile modulus (YM: ASTM D-658) of not higher than 1600 MPa, usually ranging from 1 to 1600 MPa, preferably from 1 to 150 MPa.

The α-olefin having 3–20 carbon atoms to be copolymerized with ethylene includes specifically propylene, 1-butene, 1-pentene, 1-hexene, 1-heptene, 1-octene, 1-nonene, 1-decene, 1-undecene, 1-dodecene, 1-hexadecene, 1-octadecene, 1-nonadecene, 1-eicosene, and 4-methyl-1-pentene. These α-olefins may be used singly or in combination of two or more thereof.

The ethylene/α-olefin copolymer (i-a) contains preferably the constituting unit derived from ethylene at a content ranging from 50 to 96 mole %, and the constituting unit derived from α-olefin of 3–20 carbon atoms at a content ranging from 4 to 50 mole %.

The composition ratio of the ethylene/α-olefin copolymer (i-a) is usually determined with a sample solution prepared by dissolving about 200 mg of the ethylene/α-olefin copolymer uniformly in 1 ml of hexachlorobutadiene in a test tube of 10 mm φ by measuring the $^{13}C$—NMR spectrum under conditions of temperature of 120° C., measurement frequency of 25.05 MHz, spectrum breadth of 1500 Hz, pulse repetition time of 4.2 sec, and pulse breadth of 6 μsec.

The ethylene/α-olefin copolymer (i-a) in the present invention has preferably a density (ASTM D 1505) ranging from 0.855 to 0.915 g/cm$^3$, preferably from 0.865 to 0.885 g/cm$^3$, and a melt flow rate (MFR; ASTM D 1238, 190° C., load 2.16 kg) ranging from 0.01 to 200 g/10 min, preferably from 0.5 to 40 g/10 min.

The ethylene/α-olefin copolymer (i-a) includes specifically ethylene/propylene random copolymers, ethylene/1-butene random copolymers, ethylene/propylene/1-butene random copolymers, ethylene/1-hexene random copolymers, ethylene/1-butene/1-hexene random copolymers, and ethylene /1-octene random copolymers. These copolymers may be used singly or in combination of two or more thereof.

The ethylene/α-olefin copolymer (i-a) can be produced by a conventional process with a catalyst such as a vanadium catalyst, a titanium catalyst, or a metallocene catalyst.

The modified ethylene/α-olefin copolymer (i-b) used as the ethylene/α-olefin copolymer (i) in the present invention is a soft resin prepared by grafting an unsaturated carboxylic acid or its derivative (herein after referred to as "unsaturated carboxylic acid or the like") onto the ethylene/α-olefin copolymer (i-a).

The amount of the grafting of the unsaturated carboxylic acid or the like in the modified ethylene/α-olefin copolymer ranges from 0.01% to 30% by weight, preferably from 0.01% to 10% by weight, more preferably from 0.1 to 2% by weight based on 100% by weight of the ethylene/α-olefin copolymer before the graft-modification.

The unsaturated carboxylic acid includes specifically acrylic acid, maleic acid, fumaric acid, tetrahydrophthalic acid, itaconic acid, citraconic acid, crotonic acid, isocrotonic acid, and Nagic acid™ (endo-cis-bicyclo[2.2.1]hept-5-ene-2,3-dicarboxylic acid).

The derivative of the unsaturated carboxylic acid includes, for example, halides, amides, imides, acid anhydrides, and esters of the aforementioned unsaturated carboxylic acids: specifically including maleic chloride, maleimide, maleic anhydride, citraconic anhydride, monomethyl maleate, dimethyl maleate, glycidyl maleate, and the like, Of these, preferred are unsaturated dicarboxylic acids and acid anhydrides thereof: especially, maleic acid, and Nagic acid™, and acid anhydride thereof.

The position of grafting of the unsaturated carboxylic acid on the ethylene/α-olefin copolymer (i-a) is not specially limited. The unsaturated carboxylic acid or the like may be bonded to any carbon atom of the ethylene/α-olefin copolymer (i-a).

The graft-modification of the above ethylene/α-olefin copolymer (i-a) by the unsaturated carboxylic acid and the like can be conducted by a conventional graft polymerization process. For example, the ethylene/α-olefin copolymer (i-a) is melted, and the unsaturated carboxylic acid or the like is added thereto to cause graft polymerization; or the ethylene/α-olefin copolymer (i-a) is dissolved in a solvent, and the unsaturated carboxylic acid or the like is added thereto to cause graft polymerization.

In the above process, the graft monomer such as the unsaturated carboxylic acid or the like can be grafted effectively by conducting the graft polymerization in the presence of a radical initiator. The radical initiator is used usually in an amount ranging from 0.001 to 1 part by weight based on 100 parts by weight of the ethylene/α-olefin copolymer (i-a).

The radical initiator includes organic peroxides, and azo compounds: specifically including benzoyl peroxide, dichlorobenzoyl peroxide, dicumyl peroxide, di-t-butyl peroxide, 2,5-dimethyl-2,5-di(peroxidobenzoato)hexyne-3, 1,4-bis(t-butylperoxyisopropyl)benzene, lauroyl peroxide, t-butyl peracetate, 2,5-dimethyl-2,5-di-(t-butylperoxido)hexyne-3, 2,5-dimethyl-2,5-di(t-butylperoxido)hexane, t-butyl perbenzoate, t-butyl perphenylacetate, t-butyl perisobutyrate, t-butylper-sec-octoate, t-butyl perpivalate, cumyl perpivalate, and t-butyl perdiethylacetate; and azobisisobutyronitrile, and dimethylazoisobutyrate; and so forth.

Of these radical initiators, preferred are dialkyl peroxides such as dicumyl peroxide, di-t-butyl peroxide, 2,5-dimethyl-2,5-di(t-butylperoxy)hexyne-3, 2,5-dimethyl-2,5-di(t-butylperoxy)hexane, 1,4-bis(t-butylperoxyisopropyl)benzene.

The reaction temperature of the graft polymerization with or without the radical initiator is in the range usually from 60 to 350° C., preferably from 150 to 300° C.

Propylene/α-Olefin Copolymer (ii)

The propylene/α-olefin copolymer (ii) in the present invention is a propylene/α-olefin copolymer (ii-a) which is derived by copolymerization of propylene and an α-olefin of 2 or 4–20 carbon atoms, or a modified propylene/α-olefin copolymer (ii-b) which is derived by grafting an unsaturated carboxylic acid or its derivative onto the copolymer (ii-a), and has a tensile modulus (YM: ASTM D-658) of not higher than 1600 MPa, usually ranging from 1 to 1600 MPa, preferably from 1 to 150 MPa.

The α-olefin having 2 or 4–20 carbon atoms to be copolymerized with propylene includes specifically ethylene, 1-butene, 1-pentene, 1-hexene, 1-heptene, 1-octene, 1-nonene, 1-decene, 1-undecene, 1-dodecene, 1-hexadecene, 1-octadecene, 1-nonadecene, 1-eicosene, and 4-methyl-1-pentene. These α-olefins may be used singly or in combination of two or more thereof.

The propylene/α-olefin copolymer (ii-a) contains preferably the constituting unit derived from propylene at a content ranging from 50 to 95 mole %, and the constituting unit derived from α-olefin of 2 or 4–20 carbon atoms at a content ranging from 5 to 50 mole %.

The composition ratio of the propylene/α-olefin copolymer (ii-a) is usually determined with a sample solution prepared by dissolving uniformly about 200 mg of the propylene/α-olefin copolymer in 1 ml of hexachlorobutadiene in a test tube of 10 mm φ by measuring the $^{13}$C—NMR spectrum under measurement conditions of temperature of 120° C., measurement frequency of 25.05 MHz, spectrum breadth of 1500 Hz, pulse repetition time of 4.2 sec, and pulse breadth of 6 μsec.

The propylene/α-olefin copolymer (ii-a) in the present invention has preferably a density (ASTM D 1505) ranging from 0.855 to 0.900 g/cm$^3$, preferably from 0.855 to 0.885 g/cm$^3$, and a melt flow rate (MFR; ASTM D 1238, 190° C., load 2.16 kg) ranging from 0.01 to 200 g/10 min, preferably from 0.1 to 40 g/10 min.

The stereoregularity of the polypropylene may be syndiotactic, isotactic, or atactic.

The propylene/α-olefin copolymer (ii-a) includes specifically propylene/ethylene copolymers, propylene/1-butene copolymers, propylene/ethylene/1-butene copolymers, and propylene/ethylene /1-octene copolymers. These copolymers may be used singly or in combination of two or more thereof.

The propylene/α-olefin copolymer (ii-a) can be produced by a conventional process with a catalyst such as a vanadium catalyst, a titanium catalyst, or a metallocene catalyst.

The modified propylene/α-olefin copolymer (ii-b) used as the propylene/α-olefin copolymer (ii) in the present invention is a soft resin prepared by grafting an unsaturated carboxylic acid or its derivative (hereinafter referred to as "unsaturated carboxylic acid or the like") onto the propylene/α-olefin copolymer (ii-a).

The unsaturated carboxylic acids or the like used in preparation of the modified propylene/α-olefin copolymer (ii-b) are the same compounds used in preparation of the modified ethylene/α-olefin copolymer (i-b).

The amount of the grafting of the unsaturated carboxylic acid or the like in the modified propylene/α-olefin copolymer (ii-b) ranges from 0.01 to 30% by weight, preferably from 0.01 to 10% by weight, more preferably from 0.1 to 2% by weight based on 100% by weight of the propylene/α-olefin copolymer (ii-a) before the graft-modification.

The position of grafting of the unsaturated carboxylic acid on the propylene/α-olefin copolymer (ii-a) is not specially limited. The unsaturated carboxylic acid or the like may be bonded to any carbon atom of the propylene/α-olefin copolymer (ii-a).

The graft-modification of the above propylene/α-olefin copolymer (ii-a) by the unsaturated carboxylic acid and the like can be conducted by a conventional graft polymerization process.

For example, the propylene/α-olefin copolymer (ii-a) is melted, and the unsaturated carboxylic acid or the like is added thereto to cause graft polymerization; or the propylene/α-olefin copolymer (ii-a) is dissolved in a solvent, and the unsaturated carboxylic acid or the like is added thereto to cause graft polymerization.

In this process, the graft monomer such as the unsaturated carboxylic acid or the like can be grafted effectively by conducting the graft polymerization in the presence of a radical initiator. The radical initiator is used usually in an amount ranging from 0.001 to 1 part by weight based on 100 parts by weight of the propylene/α-olefin copolymer (ii-a).

The radical initiator includes organic peroxides, and azo compounds. The specific examples of the radical initiator includes those mentioned above as the initiator for the modified ethylene/α-olefin copolymer (i-b).

The reaction temperature of the graft polymerization with or without the radical initiator is in the range usually from 60 to 350° C., preferably from 150 to 300° C.

Unsaturated Olefin Copolymer (iii)

The unsaturated olefin copolymer (iii) in the present invention is an unsaturated olefin copolymer (iii-a) which is derived by random copolymerization of ethylene, an α-olefin of 3–20 carbon atoms, and a conjugated diene monomer and/or a nonconjugated polyene monomer; or a modified unsaturated olefin copolymer (iii-b) which is derived by grafting an unsaturated carboxylic acid or its derivative onto the copolymer (iii-a), and has a tensile modulus (YM: ASTM D-658) of not higher than 1600 MPa, usually ranging from 1 to 1600 MPa, preferably from 1 to 150 MPa.

The above α-olefin is not specially limited and may be linear or branched, provided that it has 3–20 carbon atoms.

The α-olefin includes specifically propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-heptene, 1-octene, 1-nonene, 1-decene, 1-undecene, 1-dodecene, 1-tetradecene, 1-pentadecene, 1-hexadecene, 1-heptadecene, 1-octadecene, 1-nonadecene, 1-eicosene, 9-methyl-1-decene, 11-methyl-1-dodecene, and 12-ethyl-1-tetradecene. Of these, preferred are propylene, 1-butene, 1-hexene, 1-octene, and 1-decene.

The α-olefin may be used singly or in combination of two or more thereof.

The conjugated diene monomer is represented by the chemical formula below:

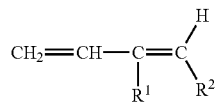

In the above chemical formula, $R^1$ and $R^2$ denotes independently a hydrogen atom, an alkyl group of 1–8 carbon atoms, or an aryl group, at least one of $R^1$ and $R^2$ being a hydrogen atom.

The conjugated diene monomer includes specifically 1,3-butadiene, 1,3-pentadiene, 1,3-hexadiene, 1,3-heptadiene, 1,3-octadiene, 1-phenyl-1,3-butadiene, 1-phenyl-2,4-pentadiene, isoprene, 2-ethyl-1,3-butadiene, 2-propyl-1,3-butadiene, 2-butyl-1,3-butadiene, 2-pentyl-1,3-butadiene, 2-hexyl-1,3-butadiene, 2-heptyl-1,3-butadiene, 2-octyl-1,3-butadiene, and 2-phenyl-1,3-butadiene. Of these, particularly preferred are 1,3-butadiene, and isoprene in view of the copolymerizability. The conjugated diene monomer may be used singly or in combination of two or more thereof.

The nonconjugated polyene monomer includes specifically dicyclopentadiene, 1,4-hexadiene, cyclooctadiene, methylenenorbornene, ethylidenenorbornene, 4,8-dimethyl-1,4,8-decatriene, 4,8-dimethyl-1,4,9-decatriene, 4,9-dimethyl-1,4,9-decatriene, 5,8-dimethyl-1,4,9-decatriene, 5,9-dimethyl-1,4,9-decatriene, and 5-vinyl-1,6-octadiene. The preferable nonconjugated polyene monomer includes aliphatic polyene compounds.

The unsaturated olefin copolymer (iii-a) has the constituting units derived from ethylene, the constituting units derived from an α-olefin of 3–20 carbon atoms, and the constituting units derived from (non)conjugated polyene monomer, the units being bonded randomly to have double bond structure of the (non)conjugated monomer, and having the main polymer chain of a substantially linear structure.

The unsaturated olefin copolymer (iii-a) has a substantially linear structure, and contains substantially no gel-like crosslinking structure. This is confirmed by the solubleness of this copolymer in an organic solvent and the substantial absence of the insoluble matter. For example, this is confirmed by complete dissolution of the copolymer in decaline at 135° C. in measurement of the intrinsic viscosity [η].

The unsaturated olefin copolymer (iii-a) employed in the present invention contains the constituting units derived from ethylene and the constituting units derived from α-olefin of 3–20 carbon atoms in a molar ratio (ethylene/α-olefin) ranging from 99/1 to 40/60, preferably from 95/5 to 50/50, more preferably from 90/10 to 55/45.

The unsaturated olefin copolymer (iii-a) employed in the present invention has preferably a density (ASTM D 1505) ranging from 0.855 to 0.880 g/cm³, more preferably from 0.855 to 0.875 g/cm³, and a Mooney viscosity ($ML_{1+4}$(100° C.)) ranging from 1 to 99, more preferably from 5 to 98.

The unsaturated olefin copolymer (iii-a) has an intrinsic viscosity [η] at 135° C. in decaline ranging usually from 0.1 to 10 dl/g, preferably from 1.0 to 7.0 dl/g. The intrinsic viscosity [η] is a measure of the molecular weight of the unsaturated olefin copolymer (iii).

The unsaturated olefin copolymer (iii-a) has an iodine value ranging preferably from 1 to 50, more preferably from 3 to 50, still more preferably from 5 to 40.

In the present invention, the unsaturated olefin copolymer (iii-a) preferably has at least one of the molar ratio of the constituting units, the intrinsic viscosity [η], and the iodine value in the aforementioned ranges. More preferably two or more thereof, still more preferably all of the molar ratio of the constituting units, the intrinsic viscosity [η], and the iodine value are in the aforementioned ranges.

The unsaturated olefin copolymer (iii-a) has a melting point (Tm) measured by DSC of preferably not higher than 110° C., more preferably not higher than 70° C., still more preferably not higher than 40° C. It has a glass transition temperature (Tg) measured by DSC of preferably not higher than 25° C., more preferably not higher than 10° C., still more preferably not higher than 0° C. Its Mw/Mn value measured by GPC is preferably not higher than 3.

The melting point (Tm) and the glass transition temperature (Tg) of the unsaturated olefin copolymer (iii-a) were measured by the procedure shown below.

A DSC endothermic curve was derived, and the temperature for the highest peak was taken as the melting point (Tm).

In the DSC measurement, the sample in an aluminum pan is heated at a rate of 10° C./min up to 200° C., kept at 200° C. for 5 minutes, and cooled at a rate of 20° C./min down to –150° C., and then the endothermic curve was derived by raising the temperature at a rate of 10° C./min.

The Mw/Mn of the unsaturated olefin copolymer (iii-a) was measured by GPC (gel permeation chromatography) at 140° C. in orthodichlorobenzene as the solvent.

The unsaturated olefin copolymer (iii-a) employed in the present invention may be a so-called oil-extended rubber, namely a rubber extended with a softener such as a known mineral oil type softener.

The unsaturated olefin copolymer (iii-a) employed in the present invention includes specifically EPDM such as ethylene/propylene/1,3-butadiene copolymers, ethylene/propylene/isoprene copolymers, and ethylene/propylene/5-ethylidene-2-norbornene copolymer rubbers; and oil-extended EPDM such as oil-extended ethylene/propylene/1,3-butadiene copolymers, oil-extended ethylene/propylene/isoprene copolymers, oil-extended ethylene/propylene/5-ethylidene-2-norbornene copolymer rubbers.

The aforementioned unsaturated olefin copolymer (iii-a) can be obtained by copolymerization, preferably random copolymerization, of ethylene, α-olefin of 3–20 carbon atoms, and the conjugated diene monomer represented by the above general chemical formula and/or the nonconjugated polyene in the presence of a known vanadium catalyst or a metallocene catalyst.

A process for producing the unsaturated olefin copolymer (iii-a) employed in the present invention, and a metallocene catalyst employed in the process are described in detail in Japanese Patent Application Laid-Open No. 11(1999)-228743.

The modified unsaturated olefin copolymer (iii-b) used as the unsaturated olefin copolymer (iii) in the present invention is a soft resin prepared by grafting an unsaturated carboxylic acid or its derivative (hereinafter referred to as "unsaturated carboxylic acid or the like") onto the unsaturated olefin copolymer (iii-a).

The unsaturated carboxylic acids or the like used in preparation of the modified unsaturated olefin copolymer (iii-b) are the same compounds used in preparation of the modified ethylene/α-olefin copolymer (i-b).

The amount of the grafting of the unsaturated carboxylic acid or the like in the modified unsaturated olefin copolymer (iii-b) ranges from 0.01 to 30% by weight, preferably from 0.01 to 10% by weight, more preferably from 0.1 to 2% by weight based on 100% by weight of the unsaturated olefin copolymer(iii-a) before the graft-modification.

The position of grafting of the unsaturated carboxylic acid on the unsaturated olefin copolymer (iii-a) is not specially limited. The unsaturated carboxylic acid or the like may be bonded to any carbon atom of the unsaturated olefin copolymer (iii-a).

The graft-modification of the above unsaturated olefin copolymer (iii-a) by the unsaturated carboxylic acid and the like can be conducted by a conventional graft polymerization process.

For example, the unsaturated olefin copolymer (iii-a) is melted, and the unsaturated carboxylic acid or the like is added thereto to cause graft polymerization; or the unsaturated olefin copolymer (iii-a) is dissolved in a solvent, and the unsaturated carboxylic acid or the like is added thereto to cause graft polymerization.

In this process, the graft monomer such as the unsaturated carboxylic acid or the like can be grafted effectively by conducting the graft polymerization in the presence of a radical initiator. The radical initiator is used usually in an amount ranging from 0.001 to 1 part by weight based on 100 parts by weight of the unsaturated olefin copolymer (iii-a).

The radical initiator includes organic peroxides, and azo compounds. The specific examples of the radical initiator includes those mentioned above for the modified ethylene/α-olefin copolymer (i-b).

The reaction temperature of the graft polymerization with or without the radical initiator is in the range usually from 60 to 350° C., preferably from 150 to 300° C.

Ethylene/Vinyl Acetate Copolymer (iv)

The ethylene/vinyl acetate copolymer (iv) in the present invention is an ethylene/vinyl acetate copolymer (iv-a) which is derived by copolymerization of ethylene and vinyl acetate, or a modified ethylene/vinyl acetate copolymer (iv-b) which is derived by grafting an unsaturated carboxylic acid or its derivative onto the copolymer (iv-a), and has a tensile modulus (YM: ASTM D-658) of not higher than 1600 MPa, usually ranging from 1 to 1600 MPa, preferably from 1 to 150 MPa.

The ethylene vinyl acetate copolymer (iv-a) employed in the present invention contains vinyl acetate unit at a content ranging preferably from 5 to 40% by weight, more preferably from 10 to 35% by weight. This ethylene/vinyl acetate copolymer (iv-a) has a melt flow rate (ASTM D 1238, 190° C., load 2.16 kg) ranging usually from 0.1 to 50 g/10 min, preferably from 0.3 to 30 g/10 min.

The modified ethylene/vinyl acetate copolymer (iv-b) used as the ethylene/vinyl acetate copolymer (iv) in the present invention is a soft resin prepared by grafting an unsaturated carboxylic acid or its derivative (hereinafter referred to as "unsaturated carboxylic acid or the like") onto the ethylene/vinyl acetate copolymer (iv-a).

The unsaturated carboxylic acids or the like used in preparation of the modified ethylene/vinyl acetate copolymer (iv-b) are the same compounds used in preparation of the modified ethylene/α-olefin copolymer (i-b).

The amount of the grafting of the unsaturated carboxylic acid or the like in the modified ethylene/vinyl acetate copolymer (iv-b) ranges from 0.01 to 30% by weight, preferably from 0.1 to 10% by weight, more preferably from 0.1 to 2% by weight based on 100% by weight of the ethylene/vinyl acetate copolymer (iv-a) before the graft-modification.

The position of grafting of the unsaturated carboxylic acid on the ethylene/vinyl acetate copolymer (iv-a) is not specially limited. The unsaturated carboxylic acid or the like may be bonded to any carbon atom of the ethylene/vinyl acetate copolymer (iv-a).

The graft-modification of the above ethylene/vinyl acetate copolymer (iv-a) by the unsaturated carboxylic acid and the like can be conducted by a conventional graft polymerization process.

For example, the ethylene/vinyl acetate copolymer (iv-a) is melted, and the unsaturated carboxylic acid or the like is added thereto to cause graft polymerization; or the ethylene/vinyl acetate copolymer (iv-a) is dissolved in a solvent, and the unsaturated carboxylic acid or the like is added thereto to cause graft polymerization.

In this process, the graft monomer such as the unsaturated carboxylic acid or the like can be grafted effectively by conducting the graft polymerization in the presence of a radical initiator. The radical initiator is used usually in an amount ranging from 0.001 to 1 part by weight based on 100 parts by weight of the ethylene/vinyl acetate copolymer (iv-a).

The radical initiator includes organic peroxides, and azo compounds. The specific examples of the radical initiator includes those mentioned before for the modified ethylene/α-olefin copolymer (i-b).

The reaction temperature of the graft polymerization with or without the radical initiator is in the range usually from 60 to 350° C., preferably from 150 to 300° C.

Cycloolefin Resin (v)

The cycloolefin resin (v) employed in the present invention includes:

(a-1) ethylene/cycloolefin random copolymers prepared by copolymerizing ethylene and a cycloolefin represented by General Formula (I) or (II) below, (a-2) ring-opening polymerization or copolymerization products of the cycloolefin represented by General Formula (I) or (II) below, (a-3) hydrogenation products of the above ring-opening polymerization or copolymerization product of (a-2), and (a-4) graft-modified products of (a-1), (a-2), or (a-3), the resin having a tensile modulus (YM: ASTM D-658) of not higher than 1600 MPa, usually in the range from 1 to 1600 MPa, preferably from 2 to 150 MPa.

The cycloolefin which is a monomer represented by General Formula (I) or (II) below and used for preparing the cycloolefin resin in the present invention is explained firstly.

The cycloolefin used for preparing the cycloolefin resin is represented by the following General Formula (I) or (II):

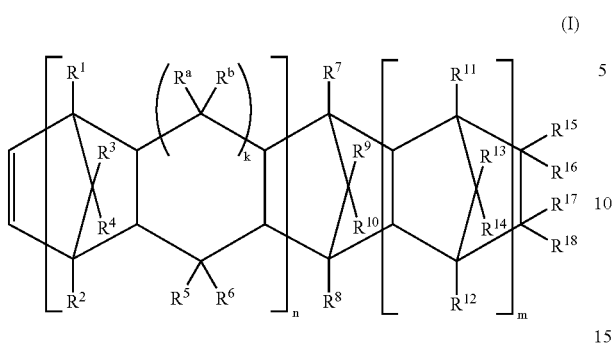
(I)

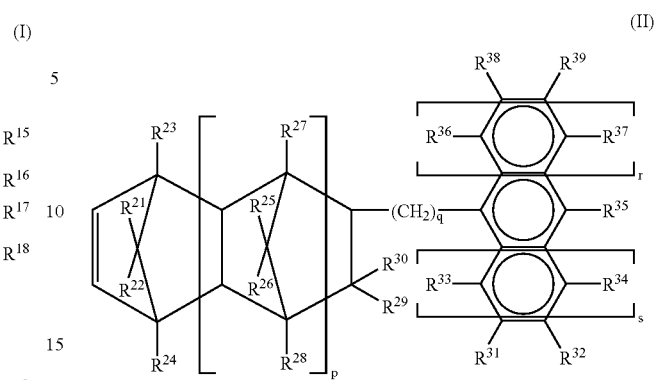
(II)

In the above General Formula (I), n denotes a number 0 or 1; m denotes 0 or a positive integer; k denotes a number 0 or 1; when k is 1, $R^a$ and $R^b$ are respectively the atom or the hydrocarbon group shown below independently, and when k is 0, $R^a$ and $R^b$ form a five-membered ring by linking the bonds.

$R^1$–$R^{18}$, $R^a$, and $R^b$ are respectively a hydrogen atom, a halogen atom, or a hydrocarbon group; the halogen atom includes fluorine, chlorine, bromine, and iodine.

The hydrocarbon groups are respectively an alkyl group of 1–20 carbon atoms, a cycloalkyl group of 3–15 carbon atoms, or an aromatic hydrocarbon group independently. Specifically, the alkyl group includes methyl, ethyl, propyl, isopropyl, amyl, hexyl, octyl, decyl, dodecyl, and octadecyl. The cycloalkyl group includes cyclohexyl. The aromatic hydrocarbon group includes phenyl, and naphthyl. The hydrocarbon group may be substituted by a halogen atom.

Further, in the above General Formula (I), $R^{15}$–$R^{18}$ may respectively be bonded together (in collaboration) to form a monocyclic or polycyclic group, which may have a double bond. Specific example of the monocyclic or polycyclic group are shown below.

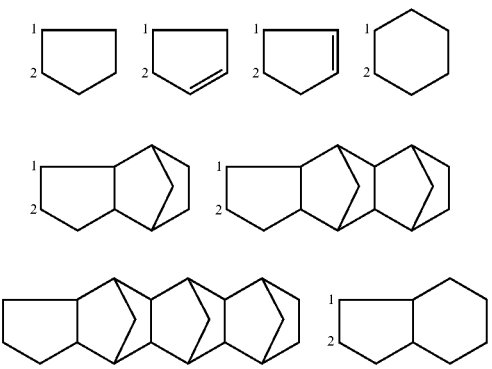

In the above exemplified formulas, the numerals 1 and 2 indicate respectively the carbon atoms where $R^{15}$ ($R^{16}$) or $R^{17}$ ($R^{18}$) are bonded.

$R^{15}$ and $R^{16}$, or $R^{17}$ and $R^{18}$ may form an alkylidene group. The alkylidene group is usually an alkylidene group of 2–20 carbon atoms and specifically includes ethylidene, propylidene, and isopropylidene.

In the above General Formula (II), p and q denote 0 or a positive integer, and r and s denote a number of 0, 1, or 2.

$R^{21}$–$R^{39}$ are respectively a hydrogen atom, a halogen atom, a hydrocarbon group, or an alkoxy group independently.

The halogen atom is the same as in the above General Formula (I).

The hydrocarbon groups are respectively an alkyl group of 1–20 carbon atoms, a halogenated alkyl group of 1–20 carbon atoms, a cycloalkyl group of 3–15 carbon atoms, or an aromatic hydrocarbon group independently. Specifically, the alkyl group includes methyl, ethyl, propyl, isopropyl, amyl, hexyl, octyl, decyl, dodecyl, and octadecyl. The cycloalkyl group includes cyclohexyl. The aromatic hydrocarbon group includes aryl groups and aralkyl groups: specifically phenyl, tolyl, naphthyl, benzyl, and phenylethyl. The alkoxy group includes methoxy, ethoxy, and propoxy.

The hydrocarbon group and the alkoxy group may be substituted by fluorine, chlorine, bromine, or iodine.

The carbon atom having $R^{29}$ and $R^{30}$ bonded thereto, and the carbon atom having $R^{33}$ bonded thereto or the carbon atom having $R^{31}$ bonded thereto may be linked together directly, or indirectly through an alkylene group of 1–3 carbon atoms. In the case where the above two carbon atoms are linked through an alkylene group, the groups $R^{29}$ and $R^{33}$ or the groups $R^{30}$ and $R^{31}$ form together an alkylene group of methylene (—$CH_2$—), ethylene (—$CH_2CH_2$—), or propylene (—$CH_2CH_2CH_2$—).

When r=s=0, $R^{35}$ and $R^{32}$, or $R^{35}$ and $R^{39}$ may be bonded together to form a monocyclic or polycyclic aromatic ring. The examples of the monocyclic or polycyclic aromatic ring formed by $R^{35}$ and $R^{32}$ for r=s=0 are shown below:

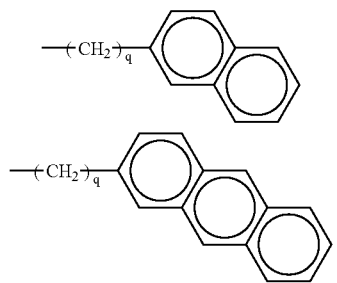

-continued

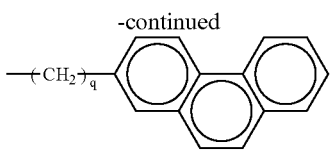

wherein q is the same as in General Formula (II).

Specific examples of the cycloolefin represented by the above General Formula (I) or (II) are shown below.

The cycloolefin which forms the cycloolefin resin (v) exemplified by bicyclo[2.2.1]-2-heptene (=norbornene) shown by the formula below, and derivatives thereof having a hydrocarbon substitutent.

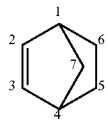

wherein the numerals 1–7 indicate carbon position numbers.

The hydrocarbon substituent includes 5-methyl, 5,6-dimethyl, 1-methyl, 5-ethyl, 5-n-butyl, 5-isobutyl, 7-methyl, 5-phenyl, 5-methyl-5-phenyl, 5-benzyl, 5-tolyl, 5-(ethylphenyl), 5-(isopropylphenyl), 5-(biphenylyl), 5-(β-naphthyl), 5-(α-naphthyl), 5-(anthryl), and 5,6-diphenyl.

The other derivatives include bicyclo[2.2.1]-2-heptene derivatives such as cyclopentadiene-acenaphthylene adduct, 1,4-methano-1,4,4a,9a-tetrahydrofluorene, 1,4-methano-1,4,4a,5,10,10a-hexahydroanthracene, and the like.

Further the derivatives include tricyclo[4.3.0.1$^{2,5}$]-3-decene, and derivatives of tricyclo[4.3.0.1$^{2,5}$]-3-decene such as 2-methyltricyclo[4.3.0.1$^{2,5}$]-3-decene, and 5-methyltricyclo[4.3.0.1$^{2,5}$]-3-decene; tricyclo[4.4.0.1$^{2,5}$]-3-undecene, and derivatives of tricyclo[4.4.0.1$^{2,5}$]-3-undecene such as 10-methyltricyclo[4.4.0.1$^{2,5}$]-3-undecene;

tetracyclo[4.4.0.1$^{2,5}$.1$^{7,10}$]-3-dodecene shown by the chemical formula below:

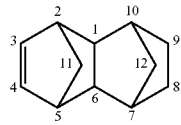

(in the formula, the numerals 1–12 indicating the carbon position numbers), and the derivatives thereof having a hydrocarbon substituent, and a compound thereof in which at least one of the hydrogen atoms are substituted with another atom.

The hydrocarbon group or a substituting atom include 8-methyl, 8-ethyl, 8-propyl, 8-butyl, 8-isobutyl, 8-hexyl, 8-cyclohexyl, 8-stearyl, 5,10-dimethyl, 2,10-dimethyl, 8,9-dimethyl, 8-ethyl-9-methyl, 11,12-dimethyl, 2,7,9-trimethyl, 2,7-dimethyl-9-ethyl, 9-isobutyl-2,7-dimethyl, 9,11,12-trimethyl, 9-ethyl-11,12-dimethyl, 9-isobutyl-11,12-dimethyl, 5,8,9,10-tetramethyl, 8-ethylidene, 8-ethylidene-9-methyl, 8-ethylidene-9-ethyl, 8-ethylidene-9-isopropyl, 8-ethylidene-9-butyl, 8-n-propylidene, 8-n-propylidene-9-methyl, 8-n-propylidene-9-ethyl, 8-n-propylidene-9-isopropyl, 8-n-propylidene-9-butyl, 8-isopropylidene, 8-isopropylidene-9-methyl, 8-isopropylidene-9-ethyl, 8-isopropylidene-9-isopropyl, 8-isopropylidene-9-butyl, 8-chloro, 8-bromo, 8-fluoro, 8,9-dichloro, 8-phenyl, 8-methyl-8-phenyl, 8-benzyl, 8-tolyl, 8-(ethylphenyl), 8-(isopropylphenyl), 8,9-diphenyl, 8-(biphenylyl), 8-(β-naphthyl), 8-(α-naphthyl), 8-(anthryl), and 5,6-diphenyl.

The derivative includes further derivatives of tetracyclo[4.4.0.1$^{2,5}$.1$^{7,10}$]-3-dodecene, pentacyclo[6.5.1.1$^{3,6}$.0$^{2,7}$.0$^{9,13}$]-4-pentadecene and its derivative, pentacyclo[7.4.0.1$^{2,5}$.1$^{9,12}$.0$^{8,13}$]-3-pentadecene and its derivative, pentacyclo[8.4.0.1$^{2,5}$.1$^{9,12}$.0$^{8,13}$]-3-hexadecene and its derivatives, pentacyclo[6.6.1.1$^{3,6}$.0$^{2,7}$.0$^{9,14}$]-4-hexadecene and its derivatives, hexacyclo[6.6.1.1$^{3,6}$.1$^{10,13}$.0$^{2,7}$.0$^{9,14}$]-4-heptadecene and its derivatives, heptacyclo[8.7.0.1$^{2,9}$.1$^{4,7}$.1$^{11,17}$.0$^{3,8}$.0$^{12,16}$]-5-eicosene and its derivatives, heptacyclo[8.7.0.1$^{3,6}$.1$^{10,17}$.1$^{12,15}$.0$^{2,7}$.0$^{11,16}$]-4-eicosene and its derivatives, heptacyclo[8.8.0.1$^{2,9}$.1$^{4,7}$.1$^{11,18}$.0$^{3,8}$.0$^{12,17}$]-5-heneicosene and its derivatives, octacyclo[8.8.0.1$^{2,9}$.1$^{4,7}$.1$^{11,18}$.1$^{13,16}$.0$^{3,8}$.0$^{12,17}$]-5-docosene and its derivatives, and nonacyclo[10.9.1.1$^{47}$.1$^{13,20}$.1$^{15,18}$.0$^{2,10}$.0$^{3,8}$.0$^{12,21}$.0$^{14,19}$]-5-pentacose its derivatives.

Examples of the cycloolefins represented by General Formula (I) or (II) usable in the present invention are show above. The more specific structure of these compounds are shown in Japanese Patent Application Laid-Open No. 7(1995)-145213, Paragraphs [0032] to [0054]. The compounds shown there can be used as the cycloolefin in the present invention.

The above cycloolefins represented by General Formula (I) or (II) can be produced by Diels-Alder reaction of a cyclopentadiene and an olefin having a corresponding structure.

These cycloolefins may be used singly or in combination of two or more thereof.

The cycloolefin resin can be produced from the cycloolefin represented by the above General Formula (I) or (II) by the process, for example, disclosed by the inventors of the present invention in Japanese Patent Application Laid-Open Nos. 60(1985)-168708, 61(1986)-120816, 61(1986)-115912, 61(1986)-115916, 61(1986)-271308, 61(1986)-272216, 62(1987)-252406, and 62(1987)-252407.

The ethylene/cycloolefin random copolymer (a-1) is a copolymer in which ethylene and the aforementioned cycloolefin are randomly bonded, containing the ethylene-derived constituting units at a content ranging usually from 20 to 95 mole %, preferably from 30 to 90 mole %, and containing the constituting unit derived from the cycloolefin at a content ranging usually from 5 to 80 mole %, preferably from 10 to 70 mole %. The constitution ratio of the constituting units derived from ethylene to the constituting units derived from the cycloolefin can be measured by $^{13}$C—NMR.

In this ethylene/cycloolefin random copolymer (a-1), the constituting units derived from ethylene and the constituting units derived from the cycloolefin are bonded in a random arrangement in a substantially linear structure. The fact that this copolymer has a substantially linear structure, and does not substantially contain a gel-like crosslinking structure is confirmed by the solubleness of this copolymer in an organic solvent and the substantial absence of the insoluble matter: for example, complete dissolution of the copolymer in decaline at 135° C. in measurement of the intrinsic viscosity [η].

In the ethylene/cycloolefin random copolymer (a-1) in the present invention, at least a part of the cycloolefin represented by General Formula (I) or (II) is presumed to constitute the repeating unit shown by General Formula (III) or (IV) below:

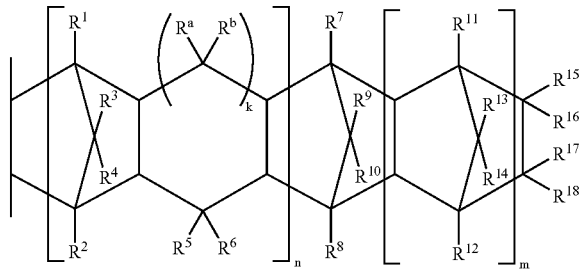

(III)

wherein the symbols n, m, k, $R^1$–$R^{18}$, $R^a$, and $R^b$ denote the same as in General Formula (I);

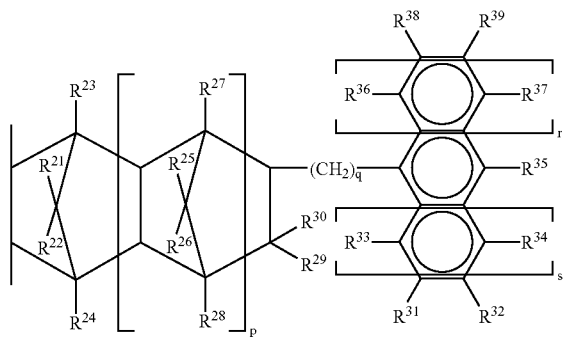

(IV)

wherein the symbols p, q, r, s, and $R^{21}$–$R^{39}$ denote the same as in General Formula (II).

The ethylene/cycloolefin random copolymer (a-1) employed in the present invention may contain a constituting unit derived from a third copolymerizable monomer as necessary within the range not to impair the object of the present invention.

Such a monomer includes olefins other than ethylene and cycloolefins mentioned above: specifically including linear or branched α-olefins of 3–20 carbon atoms such as propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene, and 1-eicosene; cycloolefins such as cyclobutene, cyclopentene, cyclohexene, 3,4-dimethylcyclopentene, 3-methylcyclohexene, 2-(2-methylbutyl)-1-cyclohexene, cyclooctene, and 3a,5,6,7a-tetrahydro-4,7-methano-1H-indene; and nonconjugated dienes such as 1,4-hexadiene, 4-methyl-1,4-hexadiene, 5-methyl-1,4-hexadiene, 1,7-octadiene, dicyclopentadiene, and 5-vinyl-2-norbornene.

The additional third monomer may be used singly or in combination of two or more thereof. In the ethylene/cycloolefin random copolymer (a-1), the constituting unit derived from the above third monomer may be contained at a content of not higher than 20 mole %, preferably not higher than 10 mole %.

The ethylene/cycloolefin random copolymer (a-1) employed in the present invention can be produced from ethylene and a cycloolefin represented by General Formula (I) or (II) by the production process disclosed in the aforementioned Patent Laid-Open Publication. Preferably this copolymerization is conducted in a hydrocarbon solvent with a catalyst formed from a vanadium compound and an organoaluminum compound soluble in the hydrocarbon solvent to form an ethylene/cycloolefin random copolymer.

In this copolymerization, the catalyst may be a Group-4 metallocene catalyst in a solid state. The solid Group-4 metallocene catalyst mentioned here is composed of a transition metal compound having a ligand having a cyclopentadienyl skeleton, an organoaluminumoxy compound, and an optionally added organoaluminum compound. The Group-4 transition metal includes zirconium, titanium, and hafnium. The transition metal has a ligand having at least one cyclopentadienyl skeleton. The ligand having a cyclopentadienyl skeleton is exemplified by cyclopentadienyl, indenyl, tetrahydroindenyl, and fluorenyl which may have an alkyl substituent. These groups may be bonded through another group such as an alkylene group. The ligand other than the one containing a cyclopentadienyl skeleton includes alkyl, cycloalkyl, aryl, aralkyl, and halogen.

The organoaluminumoxy compound and the organoaluminum compound may be the ones conventionally used in production of olefin resins. Such solid Group-4 metallocene catalysts are described, for example, in Japanese Patent Application Laid-Open Nos. 61(1986)-221206, 64(1989)-106, and 2(1990)-173112.

In the ring-opening polymerization or copolymerization product (a-2) of the cycloolefin, at least a portion of the cycloolefin represented by General Formula(I) or (II) is presumed to constitute the repeating unit represented by General Formula (V) or (VI) below:

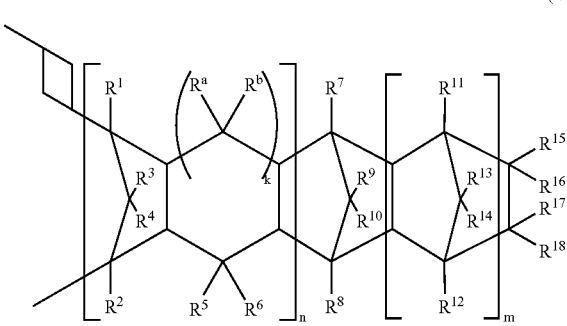

(V)

wherein the symbols n, m, k, $R^1$–$R^{18}$, $R^a$, and $R^b$ denote the same as in General Formula (I);

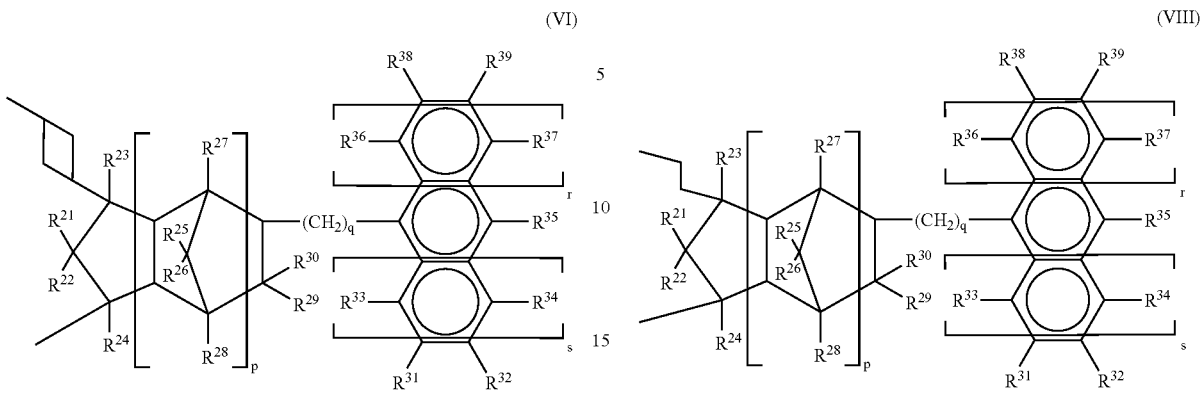

wherein the symbols p, q, r, s, and $R^{21}$–$R^{39}$ denote the same as in General Formula (II).

Such a ring-opening polymerization or copolymerization product can be produced by the production process disclosed in the aforementioned Patent Laid-Open Publication. For example, the cycloolefin represented by General Formula (I) is polymerized or copolymerized in the presence of an ring-opening polymerization catalyst.

The ring-opening polymerization catalyst may be a catalyst composed of a halide, nitrate, or acetylacetonate of a metal such as ruthenium, rhodium, palladium, osmium, indium, and platinum, and a reducing agent; or a catalyst composed of a halide or acetylacetonate of a metal such as titanium, palladium, zirconium, and molybdenum, and an organoaluminum compound.

The hydrogenation product (a-3) of the ring-opening polymerization or copolymerization product can be obtained by hydrogenating the ring-opening polymerization or copolymerization product (a-2) in the presence of a known hydrogenation catalyst.

In the hydrogenation product (a-3) of the ring-opening polymerization or copolymerization product, at least a portion of the cycloolefin represented by General Formula(I) or (II) is presumed to constitute the repeating unit represented by General Formula (VII) or (VIII) below:

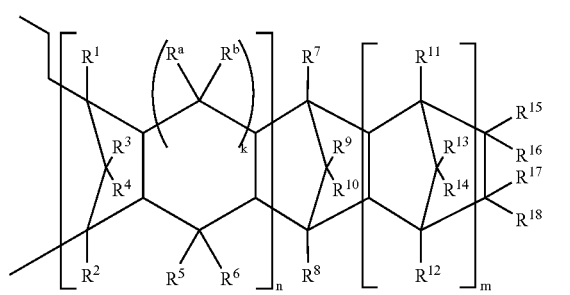

wherein the symbols n, m, k, $R^1$-$R^{18}$, $R^a$, and $R^b$ denote the same as in General Formula (I);

wherein the symbols p, q, r, s, and $R^{21}$-$R^{39}$ denote the same as in General Formula (II).

The graft-modified product (a-4) of the cycloolefin resin is a graft-modified product of the ethylene/cycloolefin random copolymer (a-1), a graft-modified product of the ring-opening polymerization or copolymerization product (a-2) of the cycloolefin, or a graft-modified product of the hydrogenation product (a-3) of the above ring-opening polymerization or copolymerization product.

The modifier is usually an unsaturated carboxylic acid or its derivative (unsaturated carboxylic acid or the like). The unsaturated carboxylic acid includes specifically (meth) acrylic acid, maleic acid, fumaric acid, tetrahydrophthalic acid, itaconic acid, citraconic acid, crotonic acid, isocrotonic acid, and endo-cis-bicyclo[2.2.1]hept-5-ene-2,3-dicarboxylic acid (Nagic acid™). The derivative of the unsaturated carboxylic acid includes, for example, unsaturated carboxylic anhydrides, unsaturated carboxylic halides, unsaturated carboxylic acid amides, unsaturated carboxylic acid imides, and esters of the unsaturated carboxylic acids.

Specific examples of the unsaturated carboxylic acid derivatives include maleic anhydride, citraconic anhydride, maleic chloride, maleimide, monomethyl maleate, dimethyl maleate, and glycidyl maleate.

Of these modifiers, preferred are α,β-unsaturated dicarboxylic acid and α,β-unsaturated dicarboxylic anhydride: especially, maleic acid, and Nagic acid™, and acid anhydride thereof. The modifier may be used singly or in combination of two or more thereof.

The amount of grafting of the unsaturated carboxylic acid or the like in the graft-modified cycloolefin resin used in the present invention is in the range from 0.01 to 30% by weight, preferably from 0.1 to 10% by weight, more preferably from 0.1 to 2% by weight based on 100% by weight of the cycloolefin resin before the graft-modification.

The graft-modified cycloolefin resin may be produced by graft-polymerizing a modifier onto the cycloolefin resin to attain an intended grafting degree, or otherwise by preparing preliminarily a modified product of high modification degree and blending this modified product with the unmodified cycloolefin resin.

The graft-modified cycloolefin resin can be produced from the cycloolefin resin and the modifier by any known polymer modification process. For example, a cycloolefin resin is melted and a modifier is added thereto to cause graft polymerization (reaction), or a cycloolefin resin is dissolved in a solvent and a modifier is added to the solution to cause graft reaction.

The graft reaction is conducted usually at a temperature ranging from 60 to 350° C. The graft reaction can be conducted in the presence of a radical initiator such as organic peroxides and azo compounds.

The cycloolefin resin (v) may be any of the resins (a-1), (a-2), (a-3), and (a-4), or combination of two or more thereof in the present invention.

The cycloolefin resin (v) has a melt flow rate (MFR: ASTM D 1238, 260° C., load 2.16 kg) ranging preferably from 0.1 to 60 g/10 min, more preferably from 2 to 50 g/10 min, still more preferably from 10 to 30 g/10 min.

Liquid (B)

The liquid (B) used in the present invention has a kinematic viscosity (JIS K-2283) at 25° C. ranging from 0.5 to 100,000 cSt (centistokes), preferably from 100 to 5,000 cSt, more preferably from 200 to 1,000 cSt; and a surface tension (by capillary-rise method) at 25° C. ranging from 10 to 50 dyn/cm, preferably from 10 to 40 dyn/cm, more preferably from 10 to 30 dyn/cm. Such a liquid (B) includes specifically silicone oils, glycol, mineral oils, and higher alcohols. The silicone oils include specifically polysiloxanes having the repeating unit represented by the formula below:

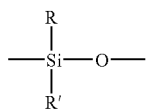

wherein R and R' denote respectively an alkyl group, an aryl group, or these groups having the hydrogen atom substituted by a halogen atom or the like independently. R and R' may the same or different. A part of the groups R or R' may be substituted by a hydroxyl group or an alkoxy group.

The alkyl group includes specifically methyl, ethyl, propyl, isopropyl, n-butyl, s-butyl, and t-butyl.

The aryl group includes specifically phenyl, and tolyl.

The halogen atom includes specifically atoms of fluorine, chlorine, bromine, and iodine.

The alkoxy group includes specifically methoxy, ethoxy, propoxy, and isopropoxy.

Of these polysiloxanes, particularly preferred are dimethylpolysiloxanes.

The liquid (B) above may be used singly or in combination of two or more thereof in the present invention.

Fine Powder (C)

The fine powder (C) in the present invention has an average particle diameter of not larger than 50 μm: usually in the range from 0.1 to 50 μm, preferably from 1 to 30 μm, more preferably from 1 to 25 μm. The average particle diameter was measured by observation by SEM (scanning electron microscopy) or optical microscopy.

The fine powder (C) preferably used in the present invention includes specifically inorganic fillers, organic fillers, fatty acids, and fatty acid derivatives.

The inorganic filler includes specifically silica, silica-alumina, diatomite, alumina, calcium carbonate, titanium oxide, magnesium oxide, pumice powder, pumice balloon, aluminum hydroxide, magnesium hydroxide, boron hydroxide, basic magnesium carbonate, dolomite, calcium sulfate, potassium titanate, barium carbonate, barium sulfate, calcium sulfite, talc, clay, mica, asbestos, calcium silicate, montmorillonite, bentonite, graphite, aluminum powder, and molybdenum sulfide. The inorganic filler may be used singly or in combination of two or more thereof.

The fatty acid used preferably in the present invention includes usually saturated or unsaturated higher fatty acids of 12–30 carbon atoms, specifically including lauric acid, myristic acid, palmitic acid, margaric acid, stearic acid, behenic acid, oleic acid, linolenic acid, α-eleostearic acid, β-eleostearic acid, and α-linolenic acid. Of these stearic acid is preferred.

The fatty acid derivative used preferably in the present invention includes salts of the aforementioned higher fatty acids: specifically sodium salts, potassium salts, magnesium salts, calcium salts, zinc salts, aluminum salts, iron salts, and lithium salts. Of these, stearic acid salts are preferred. The higher fatty acid derivative includes amides and esters of the higher fatty acids. Of these derivatives, preferred are amides and esters of stearic acid, erucic acid, oleic acid, itaconic acid, and montanic acid.

The above fatty acids or fatty acid derivatives may be used singly or in combination of two or more thereof.

Process for Producing Pellets

The soft resin pellets of the present invention can be obtained by allowing the above liquid (B) and the above fine powder (C) to adhere onto the surface of the pellets of the aforementioned soft resin (A). In the process for producing the soft resin pellets of the present invention, it is preferable that the pellets of the soft resin (A) and the liquid (B) are mechanically mixed to allow the liquid (B) to adhere onto the pellet surface and subsequently the fine powder (C) is dusted etc. onto the surface of the pellets to allow the powder adhere thereto.

Such pellets can be produced, for example, by any of the two methods below.

(1) The pellets of the soft resin (A) and the liquid (B) are mechanically mixed by a conventional method to allow the liquid (B) to adhere onto the pellet surface, and subsequently, fine powder (C) is dusted onto the surface of the pellets to allow the liquid (B) and the fine powder (C) to adhere to the pellet surface of the soft resin (A).

(2) The soft resin (A) is pelletized by melt extrusion, through an extruder equipped with a pelletizer of a so-called underwater-cut type, into water containing the liquid (B) finely dispersed therein by addition of a known surfactant (e.g., soap). Thereby the liquid (B) is allowed to adhere to the surface of the pellets. Then the fine powder (C) is dusted onto the pellet surface to allow the liquid (B) and the fine powder (C) to adhere to the pellets of the soft resin (A).

Thus, the pellet surface of the soft resin (A) is coated with the liquid (B) and the fine powder (C).

In the above method (1), the liquid (B) is allowed to adhere on the surface of the pellets of the soft resin (A) in an amount ranging usually from 50 to 20,000 ppm by weight, preferably from 100 to 2,000 ppm by weight based on the weight of the pellets of the soft resin (A), and the fine powder (C) is allowed to adhere on the surface of the pellets of the soft resin (A) in an amount ranging usually from 50 to 10,000 ppm by weight, preferably from 500 to 5,000 ppm by weight based on the weight of the pellets of the soft resin (A).

In the above method (2), the concentration of the liquid (B) in the water ranges usually from 500 to 50,000 ppm by weight, preferably from 500 to 5,000 ppm by weight, and the surfactant is used in an amount ranging usually from 1 to 100 parts by weight, preferably from 2 to 20 parts by weight based on 100 parts by weight of the liquid (B). With the above amount of the surfactant, the liquid (B) can be finely dispersed in water.

In the above method (2), the liquid (B) is allowed to adhere on the surface of the pellets of the soft resin (A) in an amount ranging usually from 50 to 20,000 ppm by weight, preferably from 100 to 2,000 ppm by weight based on the weight of the pellets of the soft resin (A), and the fine powder (C) is allowed to adhere on the surface of the pellets of the soft resin (A) in an amount ranging usually from 50 to 10,000 ppm by weight, preferably from 500 to 5,000 ppm by weight based on the weight of the pellets of the soft resin (A).

In the soft resin pellets of the present invention, at least a part of the pellet surface preferably has a structure comprising the liquid (B) layer and the fine powder (C) dispersed in the layer. It can be confirmed visually, for example.

Further, in the soft resin pellets of the present invention, it is preferable that the liquid (B) adheres to the whole surface of the pellets of the soft resin (A). It can be confirmed visually, for example.

According to the present invention, a soft resin pellet which is excellent in nonsticking properties (retardation of pellet blocking), appearance, and handling properties in comparison with soft resin pellets of conventional olefin copolymer rubbers, and the production process thereof can be provided.

EXAMPLES

The present invention is explained by reference to examples without limiting the invention in any way.

The pellet blocking test was conducted in the present invention according to the procedure shown below.

Pellet Blocking Test

A 60 g portion of the sample pellets (average weight of one pellet: about 35 mg) is put into a polyethylene pouch of 120 mm×210 mm. The pouch was folded in three, and the open end was sealed with a cellophane adhesive tape.

The three-folded pouches prepared as above were stacked in two stairs, and thereon a load of 90 g/cm$^2$ was applied in condition of 40° C. After keeping this state for 24 hours, the three-folded pouches were opened to take out the pellets. The nonsticking (noncohering) state of the pellets was rated on 10 grades as below.

(Evaluation Standard for Nonsticking Properties of Pellets)
10: No blocking is observed,
7: Blocked pellets collapse by self-weight,
5: Blocked pellets can be disintegrated readily by hand,
3: Blocked pellets can be disintegrated by strong push by hand,
1: Pellets cohere together into a bale state.

The external appearance was examined visually and was evaluated on two grades as below.

(Evaluation of External Appearance)
Good (O): No surface dustiness (the added dust (C) being not recognizable visually)
Bad (X): Dustiness (the added dust (C) being recognizable visually)

In Examples, the silicone oil, and the calcium stearate adhering to the pellet surface are determined as below.

Determination of Silicone Oil

A known mount of the pellets were washed with methyl isobutyl ketone (MIBK), a solvent for silicone oil. The washing solution was collected. The collected washing solution was subjected to fluorescent X-ray analysis. The quantity of the silicone oil was derived from the intensity of the X-ray of Si by reference to a preliminarily prepared calibration curve.

Determination of Calcium Stearate

A known mount of the pellets were subjected to fluorescent X-ray analysis. The quantity of the calcium stearate was derived from the intensity of the X-ray of Ca by reference to a preliminarily prepared calibration curve.

Incidentally, the silicone oil and the calcium stearate can be quantitatively determined by washing 100 g of the pellets with methanol, collecting the washing methanol, evaporating the methanol component, and determining silicon and calcium in the evaporation residue by metal analysis.

Example 1

An ethylene/1-butene copolymer (EBR) of density (ASTM D 1505)=0.865 g/cm$^3$, MFR (ASTM D 1238, 190° C., load 2.16 kg)=4 g/10 min, ethylene content=82 mole %, and tensile modulus (YM)=9.5 MPa was kneaded and pelletized at 200° C. with a single screw extruder. A portion of 100 parts by weight of the pelletized copolymer, 0.1 parts by weight of a silicone oil (trade name SH200, produced by Dow Corning Toray Silicone Co., Ltd.; kinematic viscosity (20° C.)=500 cSt, surface tension (20° C.)=20 dyn/cm) were mixed mechanically by a Henschel mixer.

The entire of the obtained soft resin pellets coated with the silicone oil was mixed with 0.35 parts by weight of calcium stearate having an average particle diameter of 20 μm mechanically by a Henschel mixer.

The resulting pellets contained silicone oil adhering in an amount of 990 ppm by weight, and calcium stearate adhering in an amount of 3,350 ppm by weight.

This soft resin pellet was subjected to pellet blocking test by the procedure mentioned above. Table 1 shows the results.

Comparative Example 1

The experiment was conducted in the same manner as in Example 1, except that the mechanical mixing of the silicone oil and the calcium stearate with the soft resin pellet was not conducted. Table 1 shows the results.

Comparative Example 2

The experiment was conducted in the same manner as in Example 1, except that the mechanical mixing of the calcium stearate with the soft resin pellet was not conducted. Table 1 shows the results.

Comparative Example 3

The experiment was conducted in the same manner as in Example 1, except that the mechanical mixing of the silicone oil with the soft resin pellet was not conducted. Table 1 shows the results.

Example 2

A propylene/ethylene copolymer (PER) of density (ASTM D 1505)=0.858 g/cm$^3$, MFR (ASTM D 1238, 190° C., load 2.16 kg)=2 g/10 min, propylene content=60 mole %, and tensile modulus (YM)=3.5 MPa was kneaded and pelletized at 200° C. with a single screw extruder. A portion of 100 parts by weight of the pelletized copolymer, 0.1 parts by weight of a silicone oil (trade name SH200, produced by Dow Corning Toray Silicone Co., Ltd.; kinematic viscosity (20° C.)=500 cSt, surface tension (20° C.)=20 dyn/cm) were mixed mechanically by a Henschel mixer.

The entire of the obtained soft resin pellets coated with the silicone oil was mixed with 0.35 parts by weight of calcium stearate having an average particle diameter of 20 µm mechanically by a Henschel mixer.

The resulting pellets contained silicone oil adhering in an amount of 980 ppm by weight, and calcium stearate adhering in an amount of 3,400 ppm by weight.

This soft resin pellet was subjected to pellet blocking test by the procedure mentioned above. Table 1 shows the results.

Comparative Example 4

The experiment was conducted in the same manner as in Example 2, except that the mechanical mixing of the calcium stearate with the soft resin pellet was not conducted. Table 1 shows the results.

Comparative Example 5

The experiment was conducted in the same manner as in Example 2, except that the mechanical mixing of the silicone oil with the soft resin pellet was not conducted. Table 1 shows the results.

Example 3

An oil-extended ethylene/propylene/5-ethylidene-2-norbornene copolymer (oil-extended EPDM) of density (ASTM D 1505)=0.87 g/cm$^3$, Mooney viscosity [ML$_{1+4}$(100° C.)]=74, intrinsic viscosity (135° C. in decaline)=3 dl/g, ethylene/propylene/5-ethyidene-2-norbornene (molar ratio)=78/15.8/6.2 mole %, iodine value=13, tensile modulus (YM)=2 MPa, extending oil=40 phr, and softener (trade name W-380, produced by Idemitsu Petrochemical Co.) was employed. This copolymer was kneaded and pelletized at 200° C. with a single screw extruder. A portion of 100 parts by weight of the pelletized copolymer, 0.1 parts by weight of a silicone oil (trade name SH200, produced by Dow Corning Silicone Co., Ltd.; kinematic viscosity (20° C.)=500 cSt, surface tension (20° C.)=20 dyn/cm) were mixed mechanically by a Henschel mixer.

The entire of the obtained soft resin pellets coated at the surface with the silicone oil was mixed with 0.35 parts by weight of calcium stearate having an average particle diameter of 20 µm mechanically by a Henschel mixer.

The resulting pellets contained silicone oil adhering in an amount of 950 ppm by weight, and calcium stearate adhering in an amount of 3,200 ppm by weight.

This soft resin pellet was subjected to pellet blocking test by the procedure mentioned above. Table 1 shows the results.

Comparative Example 6

The experiment was conducted in the same manner as in Example 3, except that the mechanical mixing of the calcium stearate with the soft resin pellet was not conducted. Table 1 shows the results.

Comparative Example 7

The experiment was conducted in the same manner as in Example 3, except that the mechanical mixing of the silicone oil with the soft resin pellet was not conducted. Table 1 shows the results.

Example 4

An ethylene/1-octene copolymer (EOR) of density (ASTM D 1505)=0.87 g/cm$^3$, MFR (ASTM D 1238, 190° C., load 2.16 kg)=2 g/10 min, ethylene content=85 mole %, and tensile modulus (YM)=8 MPa was used for pellet formation.

This ethylene/1-octene copolymer (EOR) was fed to an extruder equipped with a pelletizer. The ethylene/1-octene copolymer (EOR) was melt-extruded at a rate of 5 tons/h into a circulation box in which cooling water was circulated at a flow rate of 140 tons/h, and there the melt-extruded resin was cut continuously by a rotating blade into pellets, and the soft resin pellet was conveyed to a centrifugal dehydrator. The temperature of the circulating water was controlled to be at 5° C. for the purpose of preventing the cohesion of the obtained soft resin pellets. For the same purpose, a silicone oil (trade name SH200, produced by Dow Corning Toray Silicone Co., Ltd.; kinematic viscosity (20° C.)=500 cSt, surface tension (20° C.)=20 dyn/cm) was added at a rate of 10 kg/h, and for dispersing this silicone oil, a surfactant (Bulronick F108, produced by Asahi Denka Kogyo K.K.) was added at a rate of 120 g/h.

After the soft resin pellets and water were separated by the centrifugal dehydrator, the pellets were conveyed to a Henschel mixer, where calcium stearate in an amount of 3,500 ppm by weight was mixed with the pellets.

The pellets contained the silicone oil adhering in an amount of 1,100 ppm by weight, and the calcium stearate adhering in an amount of 3,000 ppm by weight.

This soft resin pellet was subjected to the pellet blocking test in the manner mentioned above. The blocking state of the pellets was evaluated to be grade 7. The pellets did not show a powder-dusted state on the surface and the external appearance of the pellets was good.

Table 1 shows the test results.

Any pellets obtained in Example 1 to 4 had silicone oil adhering to the whole surface thereof. In the silicone oil, calcium stearate existed dispersively and such structure was confirmed visually.

TABLE 1

| | Soft resin | Silicone oil (wt ppm) | Calcium stearate (wt ppm) | Blocking test result | Appearance |
|---|---|---|---|---|---|
| Example 1 | E B R | 990 | 3,350 | 7 | ○ |
| Comparative Example 1 | E B R | 0 | 0 | 3 | ○ |
| Comparative Example 2 | E B R | 980 | 0 | 5 | ○ |
| Comparative Example 3 | E B R | 0 | 3,350 | 5 | X |

TABLE 1-continued

| | Soft resin | Silicone oil (wt ppm) | Calcium stearate (wt ppm) | Blocking test result | Appearance |
|---|---|---|---|---|---|
| Example 2 | E B R | 980 | 3,400 | 5 | ○ |
| Comparative Example 4 | E B R | 980 | 0 | 1 | ○ |
| Comparative Example 5 | E B R | 0 | 3,300 | 3 | X |
| Example 3 | O-ex EPDM* | 950 | 3,200 | 5 | ○ |
| Comparative Example 6 | O-ex EPDM* | 960 | 0 | 1 | ○ |
| Comparative Example 7 | O-ex EPDM* | 0 | 3,250 | 3 | X |
| Example 4 | EOR | 1,100 | 3,000 | 7 | ○ |

*O-ex EPDM: Oil-extended EPDM

What is claimed is:

1. A process for producing a soft resin pellet, comprising the steps of contacting at least one liquid (B) with pellets of at least one soft resin (A) to coat the surface of said pellets with said liquid (B), and contacting said coated surface of said pellets with fine powder (C), wherein
said at least one liquid (B) has a kinematic viscosity at 25° C. ranging from 0.5 to 100,000 cSt (centistokes) and a surface tension at 25° C. ranging from 10 to 50 dyn/cm, and
said at least one fine powder (C) has an average particle diameter of not more than 50 μm,
said at least one soft resin (A) being selected from the group consisting of the resins (i)–(v) below and having a tensile modulus determined according to ASTM D-658 not higher than 1600 MPa:
(i) ethylene/α-olefin in copolymers produced by copolymerizing ethylene and at least one α-olefin of 3–20 carbon atoms,
(ii) propylene/α-olefin copolymers produced by copolymerizing propylene and at least one α-olefin of 2 or 4–20 carbon atoms,
(iii) unsaturated olef in copolymers produced by copolymerizing randomly ethylene, at least one α-olefin of 3–20 carbon atoms, and at least one monomer selected from the group consisting of conjugated diene monomers represented by the chemical formula below and nonconjugated polyene monomers:

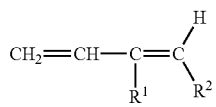

wherein $R^1$ and $R^2$ are independently a hydrogen atom, an alkyl group of 1–8 carbon atoms, or an aryl group, and at least one of $R^1$ and $R^2$ is a hydrogen atom,
(iv) ethylene/vinyl acetate copolymers containing vinyl acetate at a content ranging from 5 to 40% by weight, and
(v) cycloolefin resins.

2. The process for producing a soft resin pellet according to claim 1, wherein the soft resin (A) contains an unsaturated carboxylic acid or derivative thereof at a content ranging from 0.01 to 30% by weight based on 100% by weight of the soft resin (A), wherein said derivative of said unsaturated carboxylic acid is selected from the group consisting of halides, amides, imides, acid anhydrides, and esters thereof.

3. The process for producing a soft resin pellet according to claim 1, wherein the ethylene/α-olefin copolymer (i) is a modified ethylene/α-olefin copolyrner (i-b) prepared by grafting an unsaturated carboxylic acid or derivative thereof in a ratio of 0.01 to 30% by weight onto an unmodified ethylene/α-olefin copolymer (i-a), wherein said derivative of said unsaturated carboxylic acid is selected from the group consisting of halides, amides, imides, acid anhydrides, and esters thereof.

4. The process for producing a soft resin pellet according to claim 1, wherein the propylene/α-olefin copolymer (ii) is a modified propylene/α-olefin copolymer (ii-b) prepared by grafting an unsaturated carboxylic acid or derivative thereof in a ratio of 0.01 to 30% by weight onto an unmodified propylene/α-olefin copolymer (ii-a), wherein said derivative of said unsaturated carboxylic acid is selected from the group consisting of halides, amides, imides, acid anhydrides, and esters thereof.

5. The process for producing a soft resin pellet according to claim 1, wherein the unsaturated olefin copolymer (iii) is a modified unsaturated olef in copolymer (iii-b) prepared by grafting an unsaturated carboxylic acid or derivative thereof in a ratio of 0.01 to 30% by weight onto an unmodified unsaturated olef in copolymer (iii-a), wherein said derivative of said unsaturated carboxylic acid is selected from the group consisting of halides, amides, imides, acid anhydrides, and esters thereof.

6. The process for producing a soft resin pellet according to claim 1, wherein the ethylene/vinyl acetate copolymer (iv) is a modified ethylene/vinyl acetate copolymer (iv-b) prepared by grafting an unsaturated carboxylic acid or derivative thereof in a ratio of 0.01 to 30% by weight onto an unmodified ethylene/vinyl acetate copolymer (iv-a), wherein said derivative of said unsaturated carboxylic acid is selected from the group consisting of halides, amides, imides, acid anhydrides, and esters thereof.

7. The process for producing a soft resin pellet according to claim 1, wherein the cycloolefin resin (v) is a modified cycloolef in resin prepared by grafting an unsaturated carboxylic acid or derivative thereof in a ratio of 0.01 to 30% by weight onto an unmodified cycloolefin resin (v), wherein said derivative of said unsaturated carboxylic acid is selected from the group consisting of halides, amides, imides, acid anhydrides, and esters thereof.

8. The process for producing a soft resin pellet according to claim 1, wherein the liquid (B) is a dimethylpolysiloxane.

9. The process for producing a soft resin pellet according to claim 1, wherein the fine powder (C) comprises at least one a fatty acid or a fatty acid derivative, wherein said fatty acid derivative is selected from the group consisting of metal salts, amides, esters, and mixtures thereof.

10. The process for producing a soft resin pellet according to claim 9, wherein the fatty acid is selected from the group consisting of stearic acid, erucic acid, oleic acid, itaconic acid, and montanic acid.

11. The process for producing a soft resin pellet according to claim 1, wherein said liquid (B) is selected from the group consisting of silicone oils, glycol, mineral oils, and higher alcohols.

12. The process for producing a soft resin pellet according to claim 11, wherein said silicone oils comprise a polysiloxane having the repeating unit represented by the formula below:

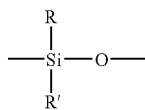

wherein R and R' may be the same or different denote respectively an alkyl group, an aryl group, or these groups having a hydrogen atom substituted by a halogen atom.

13. The process for producing a soft resin pellet according to claim 1, wherein said fine powder (C) is selected from the group consisting of inorganic fillers, organic fillers, fatty acids, and fatty acid derivatives, wherein said fatty acid derivatives are selected from the group consisting of metal salts, amides, esters, and mixtures thereof.

14. The process for producing a soft resin pellet according to claim 13, wherein said inorganic filler is selected from the group consisting of silica, silica-alumina, diatomite, alumina, calcium carbonate, titanium oxide, magnesium oxide, pumice powder, pumice balloon, aluminum hydroxide, magnesium hydroxide, boron hydroxide, basic magnesium carbonate, dolomite, calcium sulfate, potassium titanate, barium carbonate, barium sulfate, calcium sulfite, talc, clay, mica, asbestos, calcium silicate, montmorillonite, bentonite, graphite, aluminum powder, molybdenum sulfide, and mixtures thereof.

15. The process for producing a soft resin pellet according to claim 9, wherein said fatty acid has from 12–30 carbon atoms.

16. The process of producing a soft resin pellet according to claim 9, wherein said fatty acid is selected from the group consisting of lauric acid, myristic acid, palmitic acid, margaric acid, stearic acid, behenic acid, oleic acid, linolenic acid, α-eleostearic acid, β-eleostearic acid, α-linolenic acid, mixtures thereof, and derivatives thereof, wherein said derivatives are selected from the group consisting of metal salts, amides, esters, and mixtures thereof.

17. The process according to claim 1, wherein said pellets of soft resin (A) and the liquid (B) are mixed to coat the liquid (B) onto the pellet surface, and subsequently, fine powder (C) is dusted onto the surface of the pellets to allow the liquid (B) and the fine powder (C) to adhere to the pellet surface of the soft resin (A).

18. The process according to claim 1, wherein said soft resin (A) is pelletized by melt extrusion into water containing liquid (B) finely dispersed therein to cause liquid (B) to coat the surface of the pellets, with said fine powder (C) being dusted onto the pellet surface to allow the liquid (B) and the fine powder (C) to adhere to the pellets of the soft resin (A).

19. A soft resin pellet comprising;
at least one liquid (B) having a kinematic viscosity at 25° C. ranging from 0.5 to 100,000 cSt (centistokes) and a surface tension at 25° C. ranging from 10 to 50 dyn/cm, and
at least one fine powder (C) of an average particle diameter of not more than 50 μm,
which fine powder adheres to the surface of pellets of at least one soft resin (A) selected from the group consisting of the resins (i)–(v) below and having a tensile modulus determined according to ASTM D-658 not higher than 1600 MPa:
(i) ethylene/α-olefin copolymers produced by copolymerizing ethylene and at least one α-olefin of 3–20 carbon atoms,
(ii) propylene/α-olefin copolymers produced by copolymerizing propylene and at least one α-olefin of 2 or 4–20 carbon atoms,
(iii) unsaturated olefin copolymers produced by copolymerizing randomly ethylene, at least one α-olefin of 3–20 carbon atoms, and at least one monomer selected from the group consisting of conjugated diene monomers represented by the chemical formula below and nonconjugated polyene monomers:

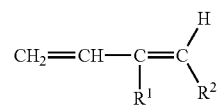

wherein $R^1$ and $R^2$ are independently a hydrogen atom, an alkyl group of 1–8 carbon atoms, or an aryl group, and at least one of $R^1$ and $R^2$ is a hydrogen atom,
(iv) ethylene/vinyl acetate copolymers containing vinyl acetate at a content ranging from 5 to 40% by weight, and
(v) cycloolefin resins, and
wherein said soft resin (A) contains an unsaturated carboxylic acid or derivative thereof at a content ranging from to 20% by weight based on 100% by weight of the soft resin (A), wherein said derivative of said unsaturated carboxylic acid is selected from the group consisting of halides, amides, imides, acid anhydrides, and esters thereof.

20. A soft resin pellet comprising;
at least one liquid (B) having a kinematic viscosity at 25° C. ranging from 0.5 to 100,00 cSt (centistokes) and a surface tension at 25° C. ranging from 10 to 50 dyn/cm, and
at least one fine powder (C) of an average particle diameter of not more than 50 μm,
which fine powder adheres to the surface of pellets of at least one soft resin (A) selected from the group consisting of the resins (i)–(v) below and having a tensile modulus determined according to ASTM D-658 not higher than 1600 MPa:
(i) ethylene/α-olefin copolymers produced by copolymerizing ethylene and at least one α-olefin of 3–20 carbon atoms,
(ii) propylene/α-olefin copolymers produced by copolymerizing propylene and at least one α-olefin of 2 or 4–20 carbon atoms,
(iii) unsaturated olefin copolymers produced by copolymerizing randomly ethylene, at least one α-olefin of 3–20 carbon atoms, and at least one monomer selected from the group consisting of conjugated diene monomers represented by the chemical formula below and nonconjugated polyene monomers:

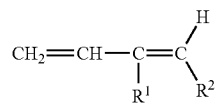

wherein $R^1$ and $R^2$ are independently a hydrogen atom, an alkyl group of 1–8 carbon atoms, or an aryl group, and at least one of $R^1$ and $R^2$ is a hydrogen atom, (iv) ethylene/vinyl acetate copolymers containing vinyl acetate at a content ranging from 5 to 40% by weight, and (v) cycloolefin resins, and wherein said liquid (B) is selected from the group consisting of silicone oils, glycol, mineral oils, and higher alcohols.

21. The soft resin pellet according to claim 20, wherein said silicone oils comprise a polysiloxane having the repeating unit represented by the formula below:

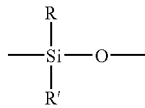

wherein R and R' may be the same or different and denote respectively an alkyl group, an aryl group, or these groups having the hydrogen atom substituted by a halogen atom or the like independently.

22. A soft resin pellet comprising;

at least one liquid (B) having a kinematic viscosity at 25° C. ranging from 0.5 to 100,000 cSt (centistokes) and a surface tension at 25° C. ranging from 10 to 50 dyn/cm, and at least one fine powder (C) of an average particle diameter of not more than 50 μm, which fine powder adheres to the surface of pellets of at least one soft resin (A) selected from the group consisting of the resins (i)–(v) below and having a tensile modulus determined according to ASTM D-658 not higher than 1600 MPa:

(i) ethylene/α-olefin copolymers produced by copolymerizing ethylene and at least one α-olefin of 3–20 carbon atoms, (ii) propylene/α-olefin copolymers produced by copolymerizing propylene and at least one α-olefin of 2 or 4–20 carbon atoms, (iii) unsaturated olefin copolymers produced by copolymerizing randomly ethylene, at least one α-olefin of 3–20 carbon atoms, and at least one monomer selected from the group consisting of conjugated diene monomers represented by the chemical formula below and nonconjugated polyene monomers:

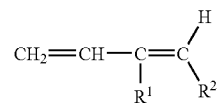

wherein $R^1$ and $R^2$ are independently a hydrogen atom, an alkyl group of 1–8 carbon atoms, or an aryl group, and at least one of $R^1$ and $R^2$ is a hydrogen atom, (iv) ethylene/vinyl acetate copolymers containing vinyl acetate at a content ranging from 5 to 40% by weight, and (v) cycloolefin resins, wherein said fine powder (C) is selected from the group consisting of inorganic fillers, organic fillers, fatty acids, and fatty acid derivatives, wherein said fatty acid derivatives are selected from the group consisting of metal salts, amides, esters, and mixtures thereof and wherein said inorganic filler are selected from the group consisting of silica, silica-alumina, diatomite, alumina, calcium carbonate, titanium oxide, magnesium oxide, pumice powder, pumice balloon, aluminum hydroxide, magnesium hydroxide, boron hydroxide, basic magnesium carbonate, dolomite, calcium sulfate, potassium titanate, barium carbonate, barium sulfate, calcium sulfite, talc, clay, mica, asbestos, calcium silicate, montmorillonite, bentonite, graphite, aluminum powder, molybdenum sulfide, and mixtures thereof.

* * * * *